Aug. 24, 1965  S. J. BARANYI  3,202,351
COMBINED WRITING IMPLEMENT AND SLIDE RULE
Filed Sept. 28, 1962  3 Sheets-Sheet 1
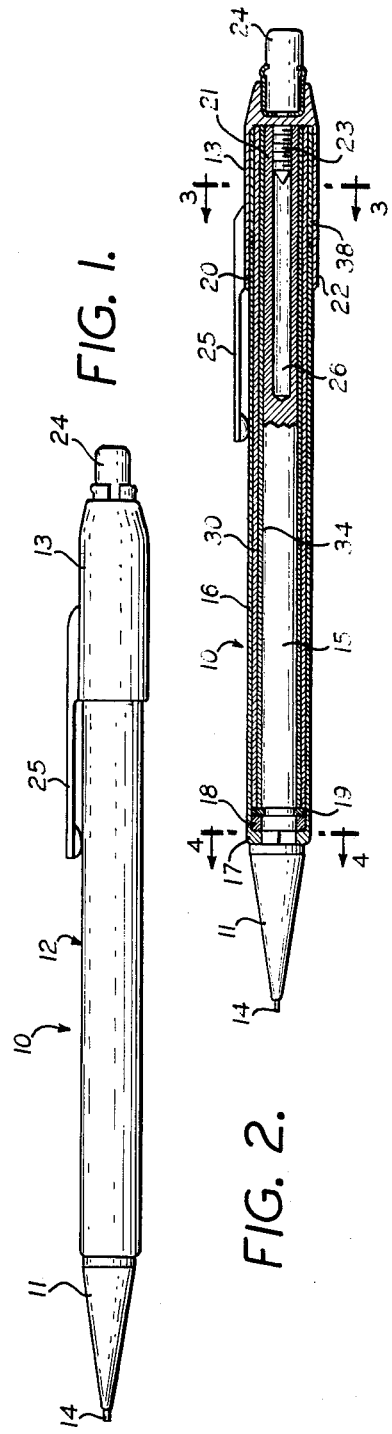
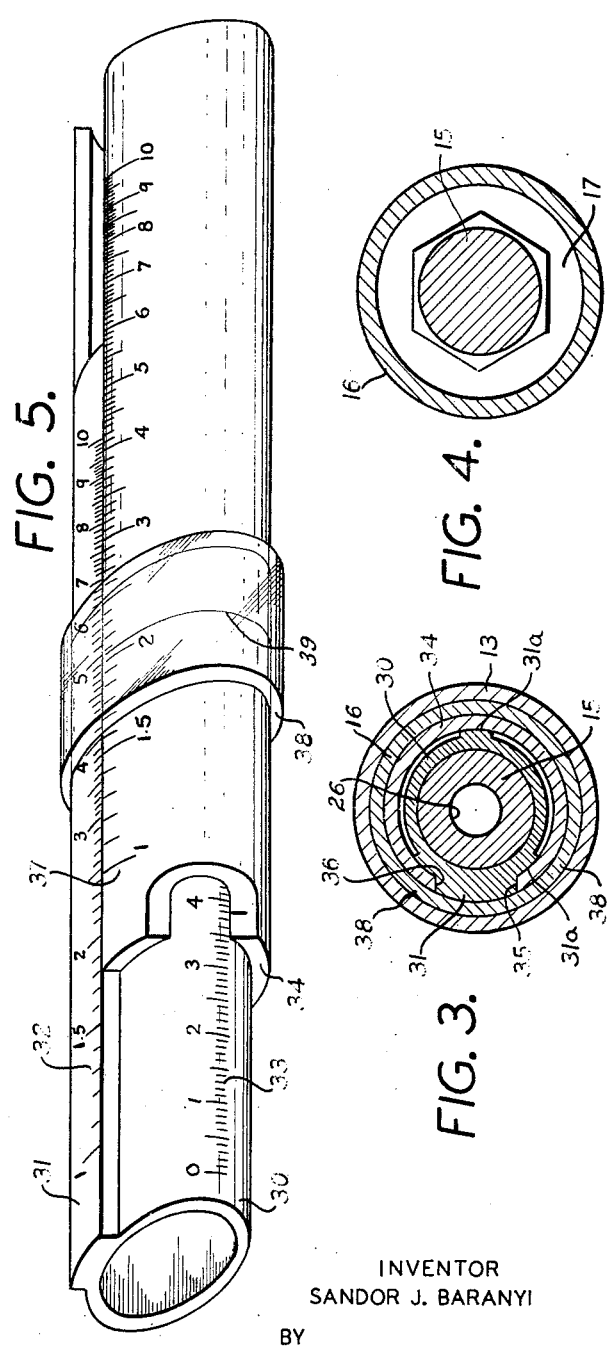
INVENTOR
SANDOR J. BARANYI
BY
DEZSOE STEINHERZ
ATTORNEY.

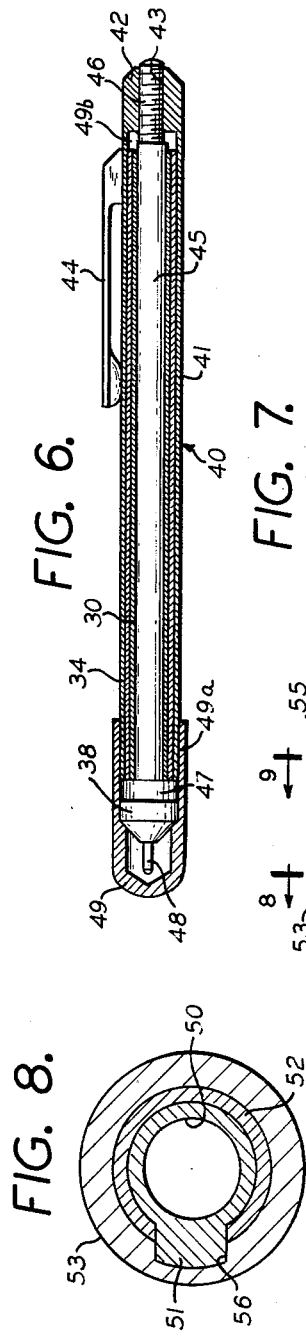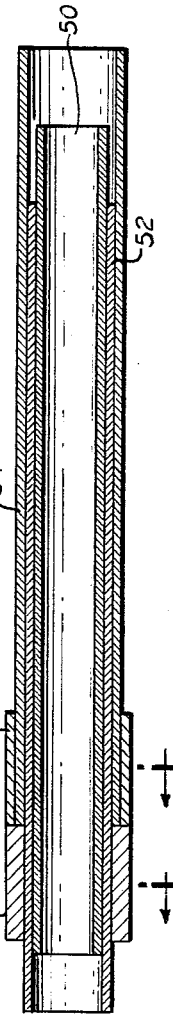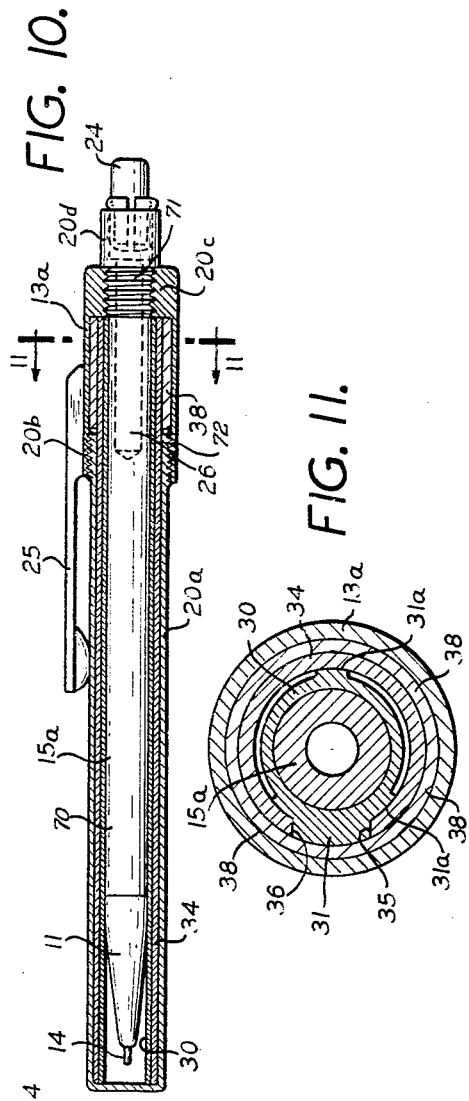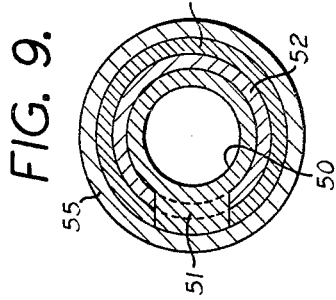

Aug. 24, 1965 S. J. BARANYI 3,202,351
COMBINED WRITING IMPLEMENT AND SLIDE RULE
Filed Sept. 28, 1962 3 Sheets-Sheet 3

INVENTOR.
SANDOR J. BARANYI
BY
Dersoe Steinherz

United States Patent Office 3,202,351
Patented Aug. 24, 1965

3,202,351
COMBINED WRITING IMPLEMENT AND
SLIDE RULE
Sandor J. Baranyi, Norwalk, Conn.
(1020 Ridgeway Ave., Rochester, N.Y.)
Filed Sept. 28, 1962, Ser. No. 226,873
12 Claims. (Cl. 235—79.5)

The invention relates to a combined writing implement and slide rule. Such combined instruments are known but in all instances the slide rule portion of the device is inseparably connected to the implement and is exposed at all times whereby its accuracy is impaired by wear resulting from friction with the user's pocket and wherein the exposure to dust and grit results in additional wearing of the parts and even to the wearing down of the exposed scales until they are no longer visible or are difficult to read. Because the two implements are inseparable, only one can be used at a time, which is frequently a disadvantage, as when a number of calculations must be made on the rule and written down by the implement.

With the foregoing in view, it is an object of the invention to provide an improved combined writing implement and slide rule.

A further object is to provide such an improved combined instrument wherein the slide rule is completely covered when not in use by portions of the writing implement.

A further object is to provide in such a last described combination, means for separating the slide rule from the writing implement for use apart from the same without impairing the use and operation of the writing implement.

A further object is to provide an improved writing implement which provides a cylindrical storage space.

A further object is to provide improved slide rules of generally cylindrical form.

Other objects and advantages reside in the specific structure of the invention, the structure of the several elements of the same, combinations and subcombinations of such elements, all of which will be readily apparent to those skilled in the art upon reference to the accompanying drawing and to the following specifications wherein the invention is shown, described and claimed.

In the drawing:

FIGURE 1 is an elevational view of a writing implement to which one species of the invention is applied;

FIGURE 2 is a longitudinal diametral section of the same;

Figure 12:
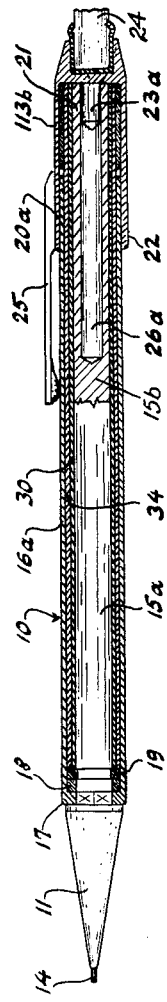
Figure 13:
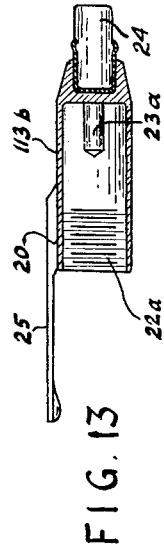
Figure 14:
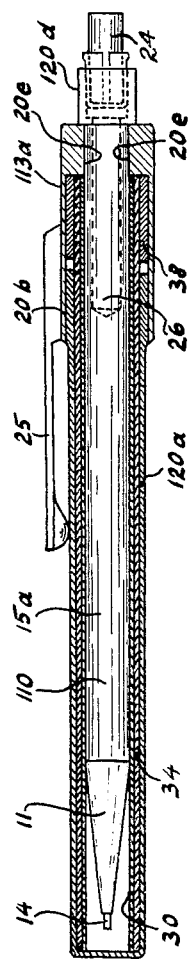

FIGURES 3 and 4 are respectively, transverse sections taken substantially on the planes of the lines 3—3 and 4—4 of FIGURE 2, FIGURE 3 showing a slight modified structure;

FIGURE 5 is an enlarged, fragmentary perspective view showng the slide rule apart from the writing implement;

FIGURE 6 is a sectional view like FIGURE 2, but showing the slide rule applied to a different form of writing implement;

FIGURE 7 is a sectional view like FIGURE 2, but showing a modified slide rule apart from a writing implement;

FIGURES 8 and 9 are, respectively, cross sectional views taken substantially on the planes of the lines 8—8 and 9—9 of FIGURE 7;

FIGURE 10 is a longitudinal sectional view showing a further modification of the invention;

FIGURE 11 is a transverse sectional view taken substantially on the plane of the line 11—11 of FIGURE 10;

FIGURE 12 is a longitudinal sectional view illustrating a further modification of the invention;

FIGURE 13 is a like view of the cap of FIGURE 12 apart from the rest of the structure; and FIGURE 14 is a longitudinal sectional view of a further modification of the invention.

Referring specifically to the drawing, wherein like reference characters designate like parts in all views, and referring at first to the species illustrated in FIGURES 1–5 inclusive, 10 designates a writing implement in the form of a mechanical pencil which includes a writing tip 11, a barrel 12 and a rear end cap 13. Tip 11 mounts a lead 14 for advance and retraction in any suitable well known manner. The barrel 12 comprises an inner core 15 and an outer shell 16, the front ends of the core 15 and shell 16 are connected together by the passage of the core through the closed front end 17 of the shell. Washers 18 and 19 permit forced rotation of the tip and core relative to the shell 16, but retain the twain against accidental rotation whereby to maintain the lead 14 in either an advanced or retracted position. The use of washer 18 is optional. Shell 16 surrounds the core 15 in concentrically spaced relation and includes a butt end 20. Core 15 likewise includes a rear end 21 which is axially bored to provide a storage space for extra pencil leads and which is internally threaded at least in the region adjacent the rear end 21.

The cap 13 comprises an outer skirt 22 and an inner, axially disposed threaded stud 23 which is threaded into the threaded rear end of the core 15 to readily detachably connect the cap to the barrel 12. The skirt 22 of the cap partially overlaps the butt end 20 of the barrel shell 16 so as to provide an enlarged cylindrical space around the core 15 rearwardly of the butt end of the shell 16. If desired, the cap 13 may mount the usual pencil eraser 24 and a pocket engaging clip 25. It is apparent from the foregoing, that the invention as so far described comprises a complete writing implement of the mechanical pencil type, which is complete with lead propelling tip 11 and lead storage space 26. In addition, it provides a cylindrical storage space around the core 15, which space is enlarged in diameter beyond the butt end 20 of the shell 16. It is contemplated that the threaded connection between the parts core 15 and stud 23 may be omitted and a friction-type connection substituted. In like manner, the friction-type connection between cap 13 and the butt end 20 of the barrel may be replaced by a threaded connection. Such a modification is disclosed in FIGURES 12 and 13 where an unthreaded stud 23a has a friction fit in the bore 26a of the core 15b. Threads 22 on cap 113b engage external threads on the butt end 20a of shell 16a.

As best seen in FIGURES 2, 3 and 5, the slide rule of this species of the invention comprises a cylindrical slide rule body 30 which is formed with a radially projecting rib 31 which extends longitudinally of body 30 for the entire length thereof. The outer surface of the rib 31 is inscribed with one or more suitable scales 32 and the remaining periphery of body 30 may be inscribed with an additional scale or scales 33. A slide 34 of split cylindrical form surrounds the arcuate portion of body 30 so that its free edges 35, 36 abut opposite sides of the rib 31. If desired, one or more longitudinal ribs, as 31a, FIGURES 3 and 5, can be used to space slide from body 30 so as to prevent wear due to sliding of scales 33 on the inner surface of 34. Slide 34 is formed of any suitable material and may have its surface inscribed with one or more scales 37 for cooperation with the scales 32 and 33 of the body 30 in a well known manner. As is apparent in FIGURE 2, the internal bore of the body 30 has a sliding fit on the core 15 of the pencil and such body and its slide are received in the cylindrical space between such core and the shell 16, there being a slight clearance between the peripheries of the rib 31 and slide 34 and the inner surface of the shell 16.

A cylindrical cursor 38 is slidable on the slide 34 and rib 31 in a well known manner. Cursor 38 is formed of any suitable transparent material and is inscribed with the usual reference marks or mark 39. As best seen in FIGURE 2, the cursor 38 fits in the enlarged cylindrical space beyond the butt end 20 of the pencil shell 16 and is covered by the skirt 22 of cap 13. It is apparent from the foregoing that the slide rule just described is a complete instrument in itself and that it is removed from the pencil when in use. This frees the pencil for use as such. At the same time, when the slide rule is not needed, it is enclosed in the dust proof case provided by the pencil barrel and cap without impairing the operation of the pencil.

The species of FIGURE 6 comprises a ball point pen 40 comprising an outer shell 41 having a closed rear end 42 formed with an internally threaded axial bore 43. A clip 44 may be secured to said shell 41 outwardly thereof and adjacent said rear end. A core 45 having an externally threaded butt end 46 is threadedly engaged with said shell bore 43 to readily detachably connect said core and shell together in spaced concentric relation to provide a cylindrical storage space therebetween. The front end of core 45 is formed with a cylindrical head 47 through which a writing tip 48 is projected in a well known manner. Head 47 has a diameter corresponding to the diameter of outer shell 41 of the pen 40 but is longitudinally spaced from the adjacent end of such shell by the length of the cursor 38. A protective cap 49 may be provided for the tip 48, if desired, and is readily detachably connected to the front end of the skell 41 in any suitable and well known manner so its skirt 49a bridges the space between head 47 and the front end of shell 41 to provide a second cylindrical space between the front end of the shell and head 47. A slide rule like that described in connection with FIGURES 1–5 inclusive is seated in said first cylindrical space with the cursor 38 disposed in the second cylindrical space.

Access to the slide rule is had by simply unscrewing the shell 41 from the threaded butt end 46 of the core and detaching the cap 49. With the slide rule removed, core and shell may be re-assembled and both units may be used separately. In this application, space 49b is provided between the rear end of the slide rule and the closed rear end 42 of the shell 41 to permit the shell to be screwed forwardly on butt end 46 until the front end of the shell engages the rear hand shoulder of 47 and rests on it and thus occupies the space not used by cursor 38 when the slide rule is separated from the writing implement.

FIGURES 7 and 8 and 9 disclose a special form of the slide rule which may be substituted for the rule disclosed in the previously described species. Here again, the body 50 is in the form of a tube having a radially extending rib 51 extending the length thereof and mounting thereon a slide 52 in the form of a split tube. A cursor 53 is slidable on the body and slide in the usual manner. Cursor 53 is formed with a longitudinally extending internal groove 56 which slidably receives rib 51 therein. However, to extend the length and the functions of this species of rule, there has been provided a second slide 54 which is likewise in the form of a split tube and which slides on top of the first named slide 52. In this connection, it should be noted that the rib 51 extends radially outwardly of the body 50 further than in the first described species of rule so that the peripheries of slide 54 and rib 51 are flush. The slide 54 is shorter than the slide 52 and mounts a second cursor 55 thereon. This arrangement permits the cursors 53 and 55 to be positioned in end-to-end relation when in the stored position whereby they may occupy one of the enlarged cylindrical spaces formed at one end of the shells of the writing implements of FIGURES 1–6, inclusive. The second slide 54 may be used with the slide 52 to extend the length of the latter and in such an instance the cursor 55 is used only on inner slide 52 while the cursor 53 is used only on outer slide 54. However, slide 54 and cursor 55 may be removed entirely, in which event the remaining parts correpond to the first described species of rule. It should be understood, of course, that the slides 52 and 54 as well as the cursors 53 and 55 are made of any suitable material. Likewise, it is understood that the several parts are inscribed with indicia, not shown, suitable for enabling them to perform the usual functions of such rules.

The rule of FIGURES 7, 8 and 9 may be used in place of the rule used in FIGURES 1–6 inclusive but, of course, in such an instance, the cylindrical cavities of the writing implements there disclosed would need to be sufficiently larger to accommodate the increased thickness of this second rule.

It follows from the foregoing that I have provided novel writing implements which provide novel storage chambers therein, in addition to novel combined writing implements and slide rules, as well as novel slide rules, all of which can be readily manufactured by simple manufacturing operations out of low priced material. It is apparent also that the novel combination provides for protection of the slide rules against abrasive dusts and grit and at the same time permits free use of both the writing implements and slide rules at all times. Also, while there has been shown and described what are now thought to be the preferred embodiments of the invention, it should be understood that the same is susceptible of still other forms and expressions. Consequently, I do limit myself to the precise species shown and described hereinabove except as hereinafter claimed.

The species of FIGS. 1 to 9 illustrate arrangements in which the slide rule is placed in a cavity within the writing implement and said cavity is used for housing the slide rule only when it is not used for performing calculations, and said cavity is empty when both the writing implement and the slide rule are being used.

According to another embodiment of my invention illustrated in FIGURES 10 and 11, the writing implement is used only for its original purpose, i.e. for writing, without providing storage space within it for the slide rule. Instead, the writing instrument is stored within the hollow interior of the slide rule, in which case a separate outer shell can be used for providing complete protection for the slide rule and either partial or complete protection for the writing implement, when not in use.

In FIGS. 10 and 11 the writing implement is exemplified as a mechanical pencil 70. Pencil 70 is generally the same as the pencil 10 and includes a like tip 11 and lead 14 as well as an eraser 24 and a lead storage space 26. However, the rear end of the body is formed with external threads 71 just forwardly of the mount 20d for the eraser. Also, the clip 25 and cap 13 are omitted to provide an uninterrupted surface forwardly of the threads 71 which is sized to have a smooth sliding fit in the hollow body 30 of a slide rule which corresponds in all respects, except possibly diameter and length, with the slide rule of the species of FIGURES 1 through 5 so need not be described in detail. The slide rule and pencil 70 are housed in a tubular case 20a having a closed forward end and a top end which is externally threaded at 72 for engaging the complementary internal threads 20b of a cap 13a which may mount the usual pocket clip 25a. The closed end 20c of cap 13a is interiorly threaded for engagement with the threads 71 of the pencil. Entry of the pencil 70 into the case 20a is limited by an annular shoulder on the forward end of the eraser mount 20d. The arrangement described provides a cylindrical space around the upper end of the slide rule slide 34 which houses the cursor 38 of the rule. The threaded opening through the closed end 20c of cap 13a is too small to permit the passage of the slide rule therethrough so the pencil 70 may be readily withdrawn and used without disturbing the slide rule if the later is not needed. When the slide rule is to be used, the cap 13a is removed to allow the rule to be slid out of the case 20a. The pencil can be replaced in the case or used if desired while still connected to the cap 13a.

In the species of FIGURE 14, the parts are the same except that the cap 13a is unthreaded as is the upper end of the case 120a whereby the parts are secured together with a friction fit only. In like manner, the pencil portion just forwardly of the eraser mount 120d is unthreaded as is the hole 20e through the closed end of the cap 113a. Again the parts are secured together by a friction fit only. Thus, the pencil 110 and the cap 113a may be quickly separated from the case 120a to permit use of the pencil and access to the slide rule. Here again the slide rule corresponds to that of FIGURES 1–5 and 10, 11. From the foregoing, it is apparent that the slide rule is fully protected at all times and the working parts of the pencil are likewise fully protected.

I claim:

1. The combination with a slide rule having a cylindrical body, a cylindrical slide slidable thereon and a cylindrical cursor slidable on said body; of a writing implement, comprising a core including a front end providing a writing tip, a tubular shell secured to said front end and surrounding said core in spaced concentric relation to provide a cylindrical space therearound, said shell having a butt end, a rear cap, means readily detachably connecting said cap to said shell and core so as to provide a second and enlarged cylindrical space beyond said butt end, said cylindrical slide rule body and slide being slidably mounted on said core in said first named cylindrical space, said cursor being disposed in said enlarged cylindrical space beyond said butt end of said shell, and said slide rule body, slide and cursor being readily removable from said core upon detachment of said cap from said shell.

2. The combination of claim 1, wherein said core comprises a hollow tube having an internally threaded rear end, and said cap includes an externally threaded stud threadedly engaging said threaded rear end of said core to provide said means readily detachably connecting said cap to said shell.

3. The combination with a cylindrical slide rule having a cylindrical cursor slidable thereon, of a writing implement including a front and rear ends, said implement comprising a core and a shell, means readily detachably connecting said core and shell together in concentric relation so as to provide a cylindrical space therebetween, said core and shell being formed to provide a second and enlarged cylindrical space at one end thereof, and said cylindrical slide rule and cursor readily removably disposed in said cylindrical spaces.

4. The combination of claim 3, there being a cap for one end of said implement, said cap having a portion partially overlapping one end of said shell so as to provide said second and enlarged cylindrical space, and said cursor being located in said last mentioned cylindrical space.

5. A writing implement comprising a core including a front end providing a writing tip, a tubular shell secured to said front end and surrounding said core in spaced concentric relation to provide a first cylindrical space therearound, said shell having a butt end, said core including a rear end formed with an axially disposed internally threaded bore, a rear cap, an externally threaded stud carried by said cap axially inwardly thereof, said stud being threadedly engageable with said bore to provide means readily detachably connecting said cap, core and shell, and said cap being disposed in partially overlapping relation to provide an enlarged second cylindrical storage space beyond said butt end of said shell.

6. The combination with a slide rule having a cylindrical body, a cylindrical slide slidable thereon, and a cylindrical cursor slidable on said slide; of a writing implement including a writing tip, a core, and a shell, said shell having a closed rear end formed with an internally threaded bore axially thereof, said core having an externally threaded butt end threadedly engageable with said bore to readily detachably connect said shell and core together, said core being smaller than the interior diameter of said shell whereby to provide a cylindrical storage space therearound, said core having an enlarged cylindrical front end having a diameter corresponding to the exterior diameter of said shell, said shell having a front end normally disposed in axially spaced relation to said enlarged front end of said core, a cap for said writing tip and including a cylindrical skirt extending over said enlarged front end of said core and partially overlapping said front end of said shell and providing a second and enlarged cylindrical space between said front ends of said core and shell, and said first named and enlarged cylindrical spaces being adapted to receive therein said slide rule and cursor respectively.

7. A slide rule, comprising an elongated cylindrical body, a radially outwardly projecting guide rib on said body and extending substantially the entire length thereof, a slide comprising a split tube slidable on said body and having opposed edges slidably engaging opposite sides of said rib to prevent relative rotation of said body and slide, and a cylindrical cursor slidable on said rib and slide, there being a longitudinally extending spacing rib on said body in diametrically opposite relation to said guide rib, a pair of longitudinally extending spacing ribs on either side of said guide rib and comprising integral lateral extensions of the same, and all of said spacing ribs extending radially outwardly of said body a like distance less than said guide rib.

8. A slide rule according to claim 7, there being a longitudinally extending spacing means integral with one of said body and slide for slightly spacing the latter from said body.

9. A slide rule according to claim 8, wherein said spacing means comprises a spacing rib in diametrically opposite relation to said guide rib.

10. The combination with a slide rule having a hollow cylindrical body, a cylindrical slide slidable thereon, and a cylindrical cursor slidable on said slide; of a case for said slide rule, said case comprising a cylindrical shell having a closed bottom and an open top, said shell being sized to receive said slide rule body and slide therein with a close sliding fit, said shell being shorter than said slide rule by the length of said cursor, a cylindrical cap for said shell comprising a closed top and a skirt, means for readily detachably connecting said skirt to said top of said shell to provide a space between the latter and said top of said cap for receiving said cursor therein, and a writing implement in said cap and extending axially of said closed top thereof into the interior of said slide rule body.

11. The combination of claim 10, there being an axially located opening through said top of said cap, said writing implement being readily detachably secured in said opening, and said opening having a diameter less than the diameter of said slide rule body.

12. The combination of claim 11, wherein said writing implement includes a rear end projecting axially outwardly of said cap.

(References on following page)

References Cited by the Examiner

UNITED STATES PATENTS

| | | | |
|---|---|---|---|
| 1,080,811 | 12/13 | Colwell | 235—79.5 |
| 2,137,630 | 11/38 | Sinitzin | 235—29.5 |
| 2,511,270 | 6/50 | Kahan | 235—79.5 |
| 2,628,025 | 2/53 | Quillinan | 235—79.5 |
| 2,656,978 | 10/53 | Nicolet | 235—79.5 |
| 2,806,649 | 9/57 | Nicolet et al. | 235—79.5 |
| 2,827,878 | 3/58 | Rosa | 120—9 |
| 2,907,301 | 10/59 | Spatz | 120—9 |

FOREIGN PATENTS 778,556 7/57 Great Britain.

LEO SMILOW, *Primary Examiner.*

LAWRENCE CHARLES, *Examiner.*